UNITED STATES PATENT OFFICE.

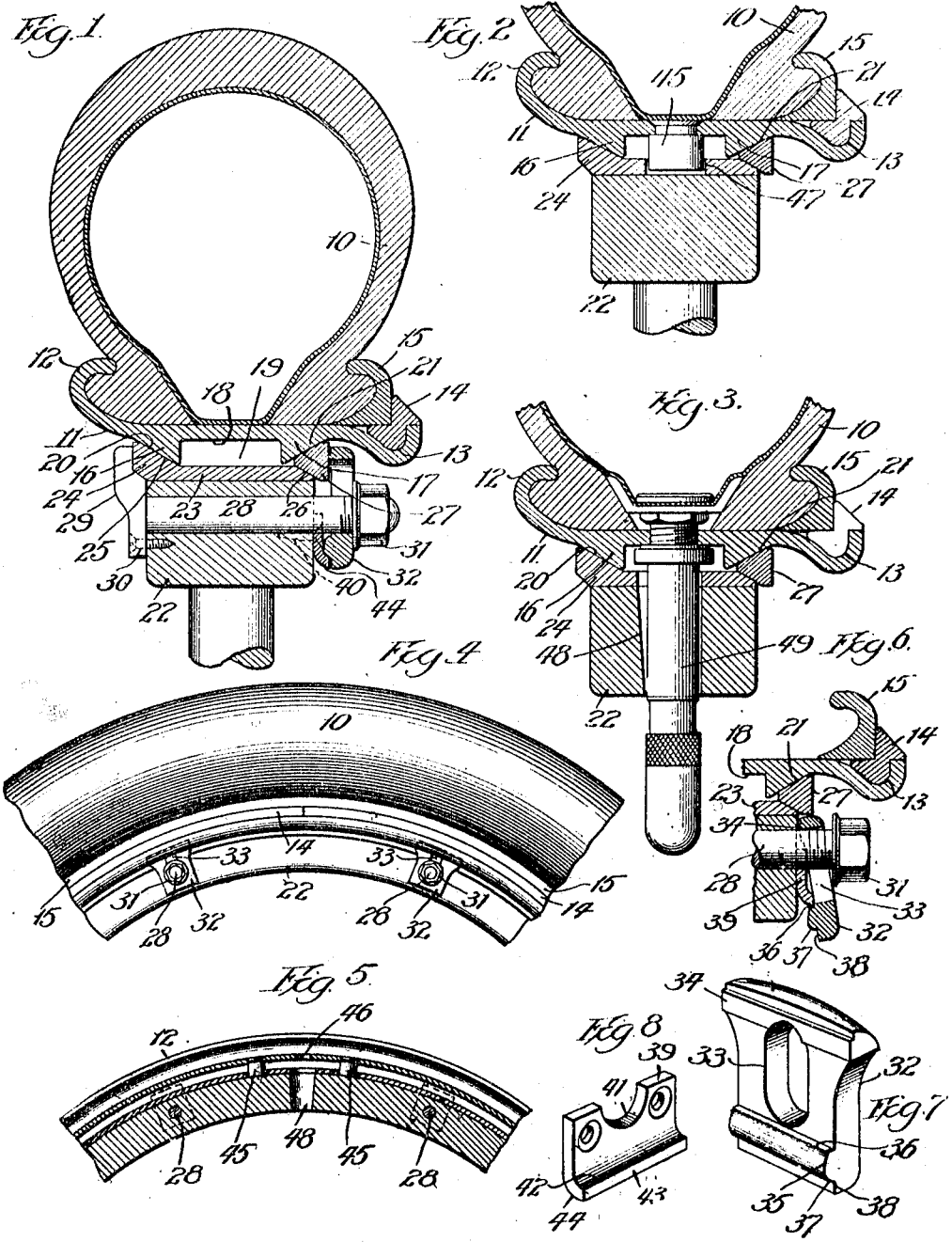
P. B. BOSWORTH.
AUTOMOBILE WHEEL RIM.
APPLICATION FILED JUNE 4, 1910.
1,031,235.
Patented July 2, 1912.

PERCY B. BOSWORTH, OF AKRON, OHIO, ASSIGNOR TO THE FIRESTONE TIRE & RUBBER COMPANY, OF AKRON, OHIO, A CORPORATION OF OHIO.

AUTOMOBILE WHEEL-RIM.

1,031,235. Specification of Letters Patent. Patented July 2, 1912.

Application filed June 4, 1910. Serial No. 565,083.

*To all whom it may concern:*

Be it known that I, PERCY B. BOSWORTH, a citizen of the United States, residing at Akron, in the county of Summit and State of Ohio, have invented certain new and useful Improvements in Automobile Wheel-Rims, of which the following is a specification.

The object of my present invention is twofold, one being the improvement of the tire-rims of vehicle-wheels to secure adequate strength for all purposes by the use of a small amount of metal properly distributed in the rim, the other object being an improved means in demountably securing tire-rims to the fellies of wheels. The latter improvement resides more particularly in the keepers and their seats employed for maintaining in position the locking ring which holds the demountable tire-rim on the wheel.

To enable those skilled in this art to have a full and complete understanding of this invention, I have illustrated an embodiment of the same in the accompanying drawing forming a part of this specification, and throughout the various views of which like reference characters refer to the same parts.

In this drawing,—Figure 1 is a section through the felly or rim portion of a wheel embodying the features of novelty and improvement constituting the essence of this invention; Fig. 2 is a similar, fragmentary section, showing one of the dowel pins for preventing circumferential travel of the tire-rim around the wheel; Fig. 3 is a similar, fragmentary section at the valve-stem; Fig. 4 is a fragmentary side elevation of a wheel embodying the features of this invention; Fig. 5 is a longitudinal section through the felly portion of such a wheel, showing the relative locations of the apertures for the valve-stem and the dowel pins; Fig. 6 is a fragmentary view similar to Fig. 1, illustrating the keeper in operative position; Fig. 7 is a perspective view of such a keeper; and Fig. 8 is a perspective view of the seat with which such keeper is intended and adapted to coöperate.

By reference to the drawings, it will be apparent that the pneumatic or other resilient tire 10 is mounted on a metallic tire-rim 11 having at one edge a hook-shaped portion 12 engaging one of the beads of the tire, and having at its opposite edge a depressed groove 13 accommodating a split locking ring 14 employed for the purpose of maintaining a removable tire-flange 15 in holding engagement with the other bead of the tire. These features of the rim which permit a ready and quick detachment of the tire form the subject matter of another co-pending application, Serial No. 534,873.

It has been customary heretofore to rivet or otherwise secure to the inner cylindrical face of the tire-rim a metallic ring or plurality of blocks oppositely beveled on their opposite sides to provide inclined seats for the proper mounting of the rim on the wheel. I have found, however, that a stronger construction, one also more economical in the employment of metal, may be had by providing or forming such inclined or beveled seats or faces on the rim itself, rather than on added or supplementary rings or blocks fastened thereto. Accordingly, in a rim embodying this invention. a pair of internal ribs 16 and 17 are formed integrally with the rim 11, the metal of such rim being so proportioned and disposed that these ribs will be of substantial body and will be connected together by a central bridge portion 18, relatively thin, and consequently comparatively weak in strength, because, since the ribs constitute the mounting means or seats for the rim, they take substantially all the strains and stresses, and for that reason the greater portion of the metal is embodied in such ribs. This construction of rim leaves a substantial cavity or annular recess 19 between the ribs, as is clearly indicated in the various figures. As is shown, the two ribs 16 and 17 have their faces oppositely beveled or inclined at 20 and 21.

On the periphery of the wheel-felly 22, I mount the metallic fixed or wheel rim 23 having at one edge a flange or rib 24 with an outer inclined face 25 with which the face 20 of rib 16 is adapted to coöperate. The opposite edge of the fixed rim 23 is beveled or inclined at 26 for the accommodation between itself and the face of rib 17 of a securing or locking ring 27 of triangular-shape in cross section, the two beveled faces of such ring being adapted to bear against the surfaces 21 and 26. This locking ring may or may not be split, but, in order that the diameter of the same may be slightly varied, in practice, such rings are ordinarily split or divided at one point.

A number of bolts 28 are extended transversely through apertures in the felly 22, such bolts at one end having heads 29 shaped to conform to the outer face of the felly and to the corresponding portion of the fixed rim 23, the heads of such bolts being desirably held from displacement by means of wood screws 30 extended therethrough into the felly proper. The shanks of such bolts are threaded, and between the nut 31 of each of such bolts and the corresponding side of the felly I employ a keeper 32 slotted at 33 and having at its outer or enlarged end a bearing face 34 adapted to press against the outer flat face of the locking ring 27. Near its opposite end, and on the same side, the keeper is equipped with a rounded integral rib 35, the opposite edge portions 36 and 37 of which are rather abrupt with respect to the adjacent surface of the keeper, that is, they are disposed substantially at right angles thereto. Between such ribs 35 and the adjacent end of the keeper is a flat shoulder 38. Each of such keepers is supplied with a seat 39 secured by suitable screws 40 to the face of the felly, each of such seats being recessed at 41 for the accommodation of the bolt, and being bent or curved outwardly at its inner edge to provide a curved rib 42 of substantially the same curvature as the rib 35 of the keeper, and having a flat outer face or surface 43. Keepers and seats of this general kind and style have been heretofore employed in connection with the locking or securing rings of demountable tire-rims, but in all of such styles, as far as I am advised, when the nut is loosened or slacked away, there is a considerable tendency and likelihood for the keeper to turn about the bolt and overlap the locking ring, when it should be free therefrom to permit ready removal of such ring. This is somewhat of an annoying occurrence, and by constructing the keepers and seats in accordance with the principles of this invention, the keepers are readily kept from such objectionable displacement or turning. When the keeper is in operative position, as shown in Fig. 1, the rib 35 is seated on the curved face of the rib 42 of seat 39, and there is but little tendency or occasion for the keeper or turn under such circumstances, because the nut is ordinarily screwed up tight against the same. When the nut is backed away to permit demounting of the tire and rim, the keepers are slid inwardly toward the axis of the wheel, as shown in Fig. 6, to free the locking ring 27, and it is under such circumstances that the detrimental and objectionable rotary movement of the keeper 5 likely to occur. In my improved construction, however, owing to the fact that the top or outer face 43 of the rib 42 is flat, there is but little tendency for the rib 35 to ride over the same, which is necessary if the keeper is to turn as indicated, this being particularly true because of the coöperation of the abrupt surface 36 with the inclined or curved face 44 of rib 42, the curvature or inclination of which is such as to readily prevent the riding over of the rib 35, so that these keepers when pushed inwardly, as shown in Fig. 6, may be readily held in such position by the nuts, which are slightly tightened, and the operator is freed from the annoyance of the keepers turning to partially or slightly overlap the locking ring which he is removing. It will, of course, be readily understood that the curved face of the rib 42 affords a neat and effective seat for the rib 35 of the keeper while the latter is being forced into or is being held in clamping relation with the locking ring.

In order to prevent creeping of the tire-rim around the wheel, I provide the same with a pair of dowel pins 45 disposed on opposite sides of the valve-stem opening 46, and adapted to be received in holes or apertures 47 in the fixed or wheel rim on opposite sides of the hole 48 of the felly, through which the valve-stem 49 is adapted to pass.

To those skilled in this art it will be apparent that by forming and shaping the removable tire-rim so that it will have seat-ribs on its inner face of substantial body, such ribs being connected by a relatively-thin bridge portion, the tire-rim may be made of less metal than has heretofore been customary, without the sacrifice of strength. It will also be apparent that I have provided a new and efficient means for properly seating and preventing rotation or turning of the keepers or clamps for the locking ring.

It is to be understood that my invention is not limited and restricted to the precise and exact details of construction herein indicated, because these may be varied within comparatively wide limits without departure from the substance of the invention and without the sacrifice of material benefits and advantages.

Although I have shown and described the use of two dowel-pins for preventing circumferential travel of the removable tire-rim from the wheel or fixed rim, it is to be understood that one pin alone may be used, if desired, or any other suitable means employed for accomplishing the same purpose.

I claim:

1. In a vehicle-wheel, the combination of a fixed rim, a removable rim, a locking ring adapted to co-act with said removable rim to hold the same in place on the fixed rim, a slotted slidable keeper coöperating with said locking ring, a seat for said keeper on the wheel-felly, said keeper having a rib adapted to rest on said seat, the latter having a flange on its portion toward the axis of the wheel constituting the rest for the keeper, that surface of said flange nearer said axis being turned outwardly away from the adjacent face of the felly beneath it, and holding means for said keeper, substantially as described.

2. In a vehicle-wheel, the combination of a fixed rim, a removable rim, a locking ring adapted to co-act with said removable rim to hold the same in place on the fixed rim, an apertured keeper coöperating with said locking ring, a seat for said keeper on the wheel-felly, said keeper having a rib adapted to rest on said seat, and said seat being of substantially uniform thickness and having a flange at one edge formed by curving up a portion of the seat, and holding means for said keeper, substantially as described.

3. In a vehicle-wheel, the combination of a fixed rim, a removable rim, a locking ring adapted to co-act with said removable rim to hold the same in place on the fixed rim, a slotted slidable keeper coöperating with said locking ring, a seat having an outwardly projecting flange for supporting said keeper on the wheel felly, said keeper having a rib adapted to rest on said seat, the faces of said rib on opposite sides being disposed relative to the face of the keeper to alternately engage the said flange from above and below the same, and holding means for said keeper, substantially as described.

4. In a vehicle wheel, the combination of a fixed rim, a removable rim, a locking ring adapted to co-act with said removable rim to hold the same in place on the fixed rim, a slidable keeper coöperating with said locking ring and having a rib, a seat for the keeper on the wheel felly with which said rib is adapted to co-act, said seat having a flange, said rib and flange coöperating to permit a freer movement of the keeper over the flange when shifted toward the axes of the rims than when moved away from said axes, and holding means for said keeper, substantially as described.

5. In a vehicle wheel, the combination of a fixed rim, a removable rim, a locking ring adapted to co-act with said removable rim to hold the same in place on the fixed rim, a slidable keeper coöperating with said locking ring and having a rib, a seat for the keeper on the wheel felly with which said rib is adapted to coöperate, said seat having a flange, said rib being disposed on one side of the flange when the keeper is in ring-engaging position and on the other side when retracted to permit removal of the locking ring, and holding means for said keeper, substantially as described.

6. In a vehicle wheel, the combination of a fixed rim, a removable rim, a locking ring adapted to co-act with said removable rim to hold the same in place on the fixed rim, a slidable keeper coöperating with said locking ring and having a rib, a seat for the keeper on the wheel felly with which said rib is adapted to co-act, said seat having a rib is adapted to co-act, said seat having a flange, the upper and lower surfaces of which extend in the same general direction, said rib and flange coöperating to permit a freer movement of the keeper over the flange when shifted toward the axes of the rims than when moved away from such axes, and holding means for said keeper, substantially as described.

7. In a vehicle wheel, the combination of a wheel rim, a separate tire rim, and means for removably securing the tire rim on the wheel rim, including a keeper operatively associated with the tire rim, a seat for said keeper and coöperating flanges or ribs on the seat and keeper engaging in one position to maintain the keeper in its active position and in another position to maintain the keeper in its inactive position.

PERCY B. BOSWORTH.

Witnesses:
 HENRY M. HUXLEY,
 WALTER M. FULLER.